United States Patent [19]
Audren

[11] Patent Number: 5,747,951
[45] Date of Patent: May 5, 1998

[54] VIBRATION MOTOR WITH A ROTOR/STATOR INTERFACE MADE OF SHAPE MEMORY ALLOY

[75] Inventor: Jean Thierry Audren, St Remy les Chevreuse, France

[73] Assignee: SFIM Industries, Massy, France

[21] Appl. No.: 758,527

[22] Filed: Nov. 29, 1996

[30] Foreign Application Priority Data

Nov. 30, 1995 [FR] France .................... 95 14169

[51] Int. Cl.$^6$ .................................. H01L 41/08
[52] U.S. Cl. ...................... 318/114; 310/15; 310/323
[58] Field of Search ....................... 310/15, 17, 20, 310/321, 323; 318/114

[56] References Cited

U.S. PATENT DOCUMENTS 5,159,224 10/1992 Kramer et al. .................... 310/323

FOREIGN PATENT DOCUMENTS 0 612 115 A1 10/1988 European Pat. Off. .

OTHER PUBLICATIONS

European Search Report, Aug. 1, 1996.

Japanese Patent Abstract, Publication No. JP64001483, May 1, 1989.

*Primary Examiner*—Steven L. Stephan
*Assistant Examiner*—Judson H. Jones
*Attorney, Agent, or Firm*—McDermott, Will & Emery

[57] ABSTRACT

A vibration motor comprising a stator and a rotor together with excitation means for deforming said stator in a vibratory mode enabling it to rotate the rotor, the motor being characterized in that the stator and/or the rotor include(s) a shape memory alloy in the vicinity of or at a zone of mutual contact between the rotor and the stator.

12 Claims, 4 Drawing Sheets

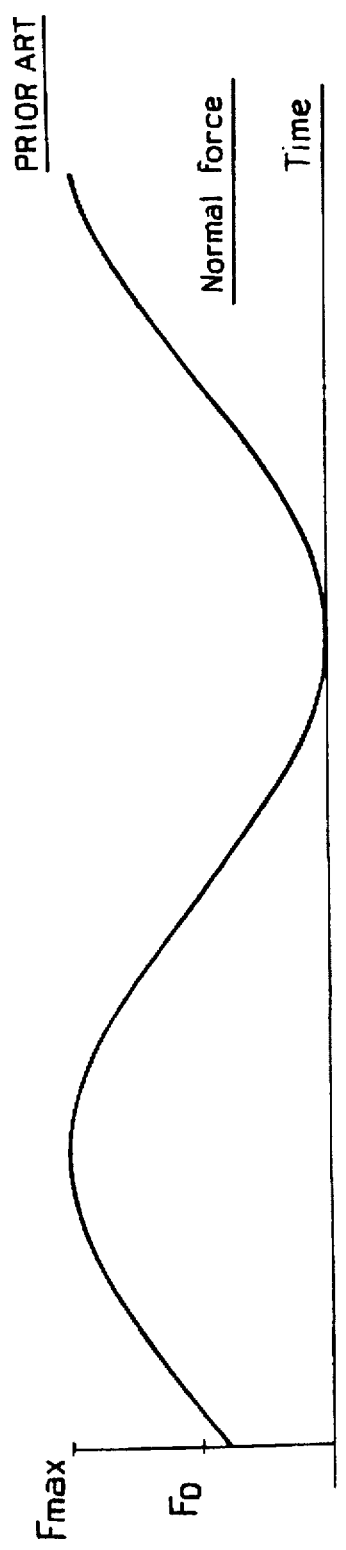
FIG_1a — PRIOR ART — Normal force vs Time
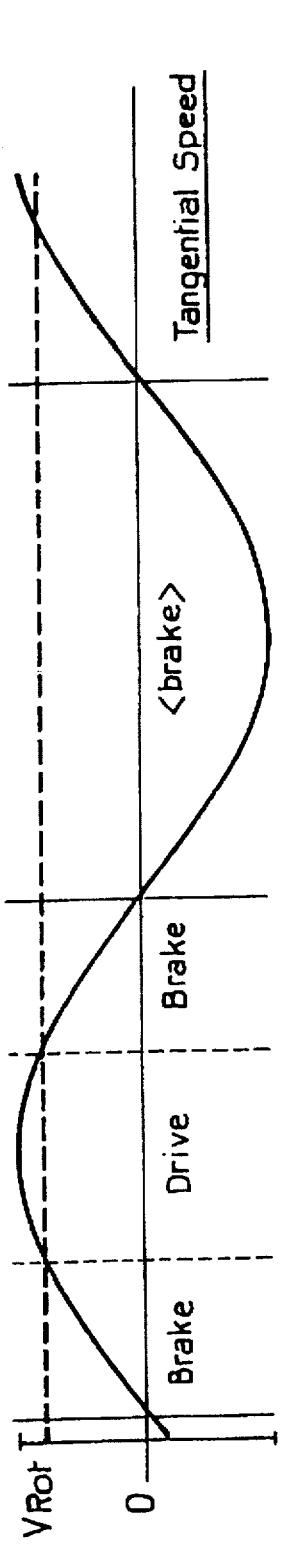
FIG_1b — Tangential Speed vs Time
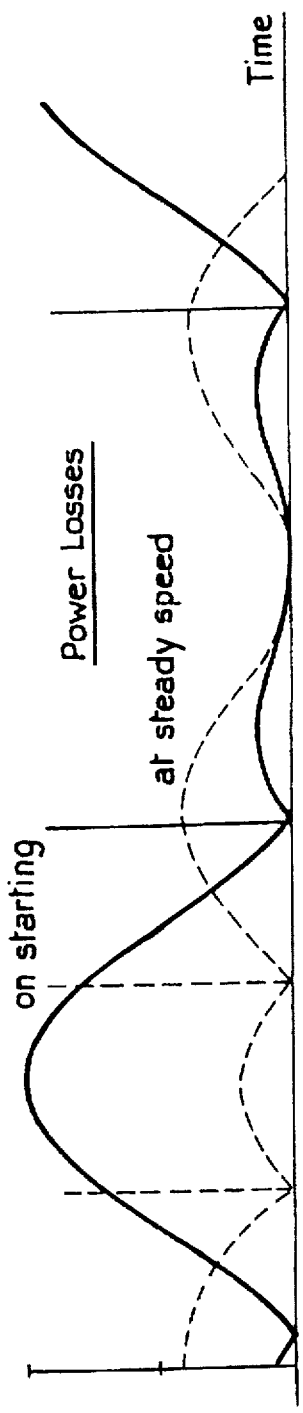
FIG_1c — Power Losses vs Time

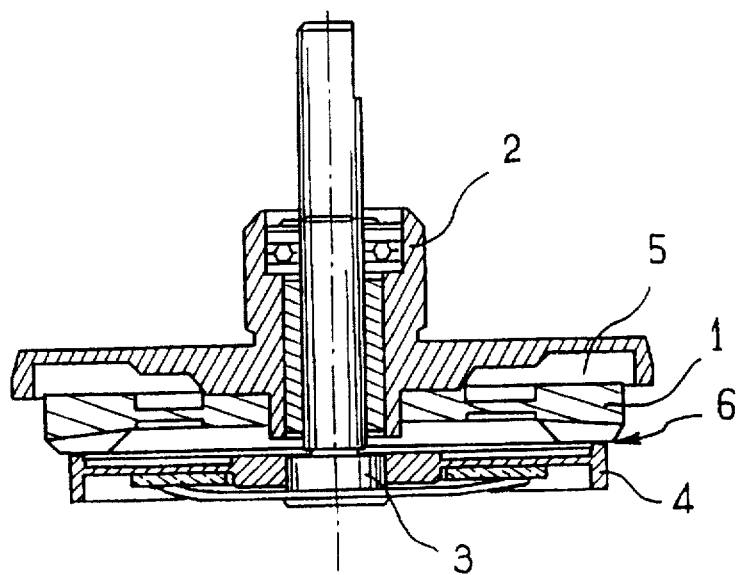
FIG_2
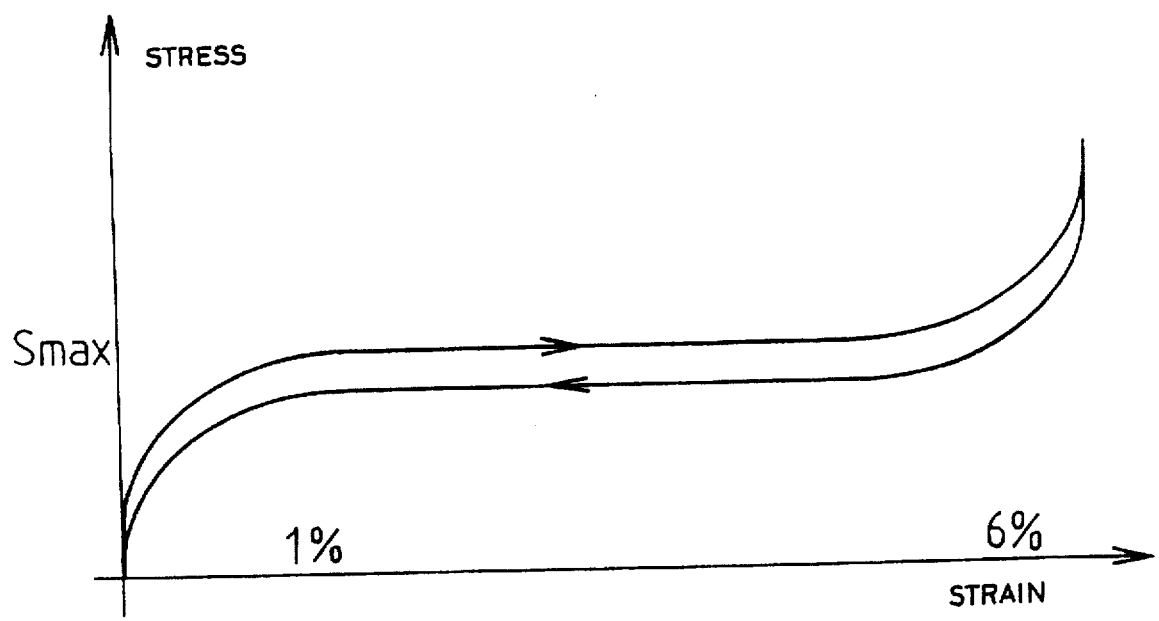
FIG_3

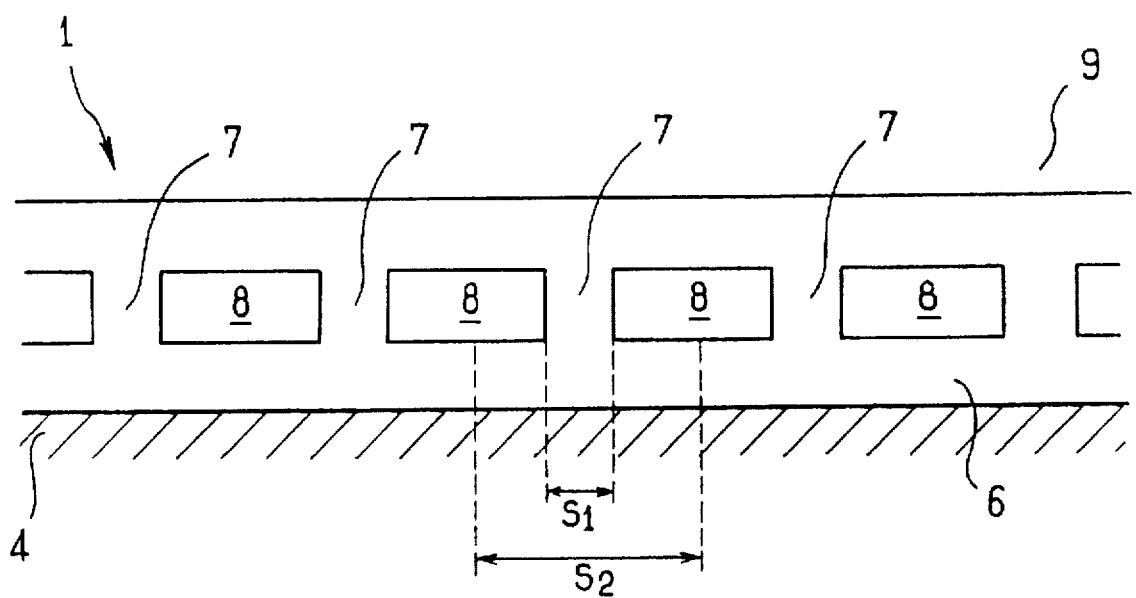
FIG_4

VIBRATION MOTOR WITH A ROTOR/STATOR INTERFACE MADE OF SHAPE MEMORY ALLOY

The present invention relates to vibration motors.

Vibration motors are also known under other names such as ultrasound motors which refers to their preferred frequency of use, or piezoactive motors which refers to their preferred excitation material.

BACKGROUND OF THE INVENTION

Conventionally, vibration motors include a rotor/stator contact interface which is the seat of phenomena enabling the rotor to be driven relative to the stator.

They operate on the principle of combining cyclical deformation of the stator tangentially to the contact surface with a synchronous cyclical normal force. These cyclical forces and deformations are obtained by means of an active material that is piezoelectric, magneto strictive, or electrostrictive. In combination, the tangential deformation and the normal force co-operate by friction to create a non-zero mean force that can be used to drive the rotor with continuous motion in a constant direction.

At present, vibration motors provide mechanical power that is restricted to a few tens of watts. Nevertheless, they already present power density per unit mass that is much better than that of conventional motor and gear units.

It may also be observed that they generally operate about operating points that cause stress to be applied to the ceramics of the rotors and stators that is small compared with their capabilities: 1 MPa to 2 MPa compared with maximum stress values of about 50 MPa. Increasing the stress on the ceramic would make it possible to increase motor torque without increasing the mass thereof. That would consequently make it possible to achieve increased operating power levels at even greater power densities per unit mass.

Nevertheless, increasing available power of present-day designs gives rise to an increase in the amount of energy dissipated at the friction interface between the rotor and the stator.

This is illustrated in accompanying FIGS. 1a to 1c which show the operating cycle of a present piezo-active motor.

More particularly, in FIG. 1a, there is shown one cycle of the normal force between the friction zones of the rotor and of the stator.

This force is shown as a sinewave since most such motors operate on the basis of sinewave motion in order to improve operation thereof by means of resonance. Naturally, other types of excitation are possible. Nevertheless, to simplify explanation, the common case of sinewave vibration is referred to herein.

The tangential speed $V_{Stat}$ of the contact zones of the stator is shown in FIG. 1b.

FIG. 1b also shows the speed of rotation $V_{Rot}$ of the rotor under steady conditions.

The rotor receives drive when the tangential speed in the friction zones of the stator is equal to or greater than the rotor speed.

The power lost by friction during such a cycle is shown in FIG. 1c for two different operating points of the motor, with the continuous line representing starting and the dashed line representing the speed $V_{Rot}$.

On starting, i.e. when $V_{Rot}=0$, friction losses are small but not negligible during the period of the cycle when the friction zones of the stator present negative speed, i.e. when they are returning to their initial positions after driving the rotor.

At stabilized speed, i.e. for $V_{Rot}>0$, power losses during the driving period decrease, but they increase during the return period of the drive zones.

OBJECTS AND SUMMARY OF THE INVENTION

An object of the invention is to propose a piezo active motor in which energy dissipation associated with cyclic friction is eliminated, or is at any rate greatly reduced.

In particular, with a motor of such a structure and at equivalent density per unit mass, it is possible to develop operating torques that are much greater than those of prior art vibration motors.

To this end, the invention provides a vibration motor comprising a stator and a rotor together with excitation means for deforming said stator in a vibratory mode enabling it to rotate the rotor, the motor being characterized in that the stator and/or the rotor include(s) a shape memory alloy in the vicinity of or at a zone of mutual contact between the rotor and the stator.

In particular, and advantageously, the excitation means are controlled in such a manner that during each cycle, the rotor and the stator press against each other without slip in said contact zone during a first portion of the cycle, and do not press against each other during the other portion of the cycle.

BRIEF DESCRIPTION OF THE DRAWINGS

Other characteristics and advantages of the invention appear further from the following description. The description is purely illustrative and non-limiting. It should be read with reference to the accompanying drawings, in which:

FIGS 1a to 1c, described above, are graphs showing the operation of a prior art piezoactive motor;

FIG. 2 is a diagrammatic section through one possible structure of a piezoactive motor of the invention;

FIG. 3 is a graph in which stress/deformation hysteresis curves are plotted for a shape memory alloy;

FIG. 4 is a schematic drawing in section view of the interface between the stator and rotor of the motor of FIG. 2;

MORE DETAILED DESCRIPTION

Figure 5A:
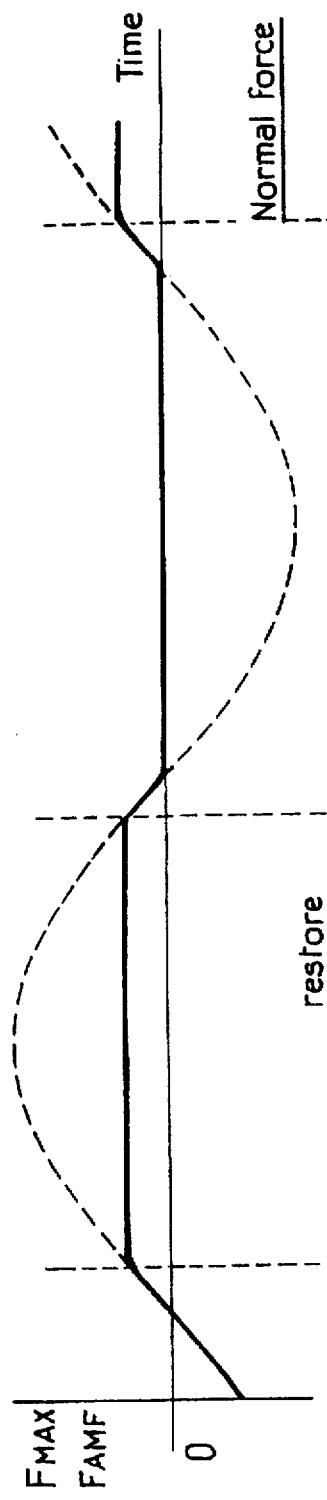
FIGS. 5a and 5b are graphs similar to those of FIGS. 1a and 1b for a piezoactive motor of the invention.

The vibration motor shown in FIG. 2 is an ultrasound type piezoactive motor.

It comprises a stator 1 mounted on a body 2 and a rotor 4 mounted on a shaft 3 which passes through the stator and the body 2, the rotor 4 being driven by friction by deformation of the stator 1.

The face of the stator 1 facing away from the rotor 4 carries a plurality of elements 5 of piezoelectric ceramic that are distributed in a ring around the stator 1 and that are intended to deform it so as to cause it to drive the rotor 4. The ring 5 is excited under harmonic conditions by a sinusoidal electrical voltage.

The various contact zones between the stator 1 and the rotor 4 include a shape memory alloy.

For a general description of shape memory alloys, reference may advantageously be made to the following work:

E. Patoor, M. Berveiler—"Technologie des alliages à mémoire de forme" [Shape memory alloy technology], published in Traité des Nouvelles Technologies, Hermes, 1994.

In particular, shape memory alloys have the characteristic of being superelastic down to very low temperatures. One example of a stress/strain curve for such an alloy is given in FIG. 3. As can be seen in the figure, such an alloy has a large superelastic range during which it deforms at substantially constant stress.

For example, in the interface zones between the stator 1 and the rotor 4, the motor has a Cu—Zn—Al alloy layer with a thickness of a few millimeters.

By way of example, the layer 6 is a contact layer. It could naturally equally well be integrated in a stack, e.g. being protected by a contact shoe made of strong ceramic.

Preferably however, the zones of the zones of shape memory alloys—in which the deformations and constraints are localised—are of little dimensions (a few micrometers) so as in the first hand amplifying the constraint by concentrating them in zones of small volume and on the other hand, to permit the isotherm operation of the alloy for the cycle frequencies usually used for piezoactive motors (a plurality of tens of KHz).

As concerns the second point, one will note in particular that the thermal time constant of the shape memory alloys zone is function of their dimensions, and in particular, for constant form factors, it is proportionnal to the dimension of said zones. Now, if the thermal time constant is higher than the cycle period of the motor, the shape memory alloy zones deform in an adiabatical mode; their heating has the effect of increasing the value of the platform which continues the classical elasticity zone and therefore makes the superelasticity disappear.

By way of example, it has been represented on FIG. 4 a possible structure for the interface between stator 1 and rotor 4.

At this interface, stator 1 presents a contact layer 6 which bears an array of elements of shape memory alloy (pegs 7).

Such a structure is particularly advantageous since it permits to amplify in the shape memory material the stresses which are tangential and normal to the contact layer 6.

The amplification ratio is approximatively of the order of $S_1/S_2$, where $S_1$ is the surface of on peg 7 and $S_2$ is the surface of the contact layer 6 brought to the number of pegs 7. Advantageously, the contact layer 6 is also of shape memory alloy.

In the example illustrated on FIG. 4, the pegs 7 and the contact layer 6 are of one piece, pegs 7 being defined by recesses 8 disposed inside a layer 9 in shape memory alloy.

In an other embodiment, pegs 7 could also be welded between two layers in shape memory alloy.

Pegs 7 are for example of a circular section.

The thicknesses of pegs 7 and of layer 9 are of the order of a few micrometers.

One will further note that by adjusting the ratio between the width and/or the thickness of the pegs 7 and of the layer 6, it is possible to adapt the values of the plateaus of (normal) compressions stress and of (tangential) shear stress.

Other structures that the one illustrated on FIG. 4 are of course possible.

Figure 5B:
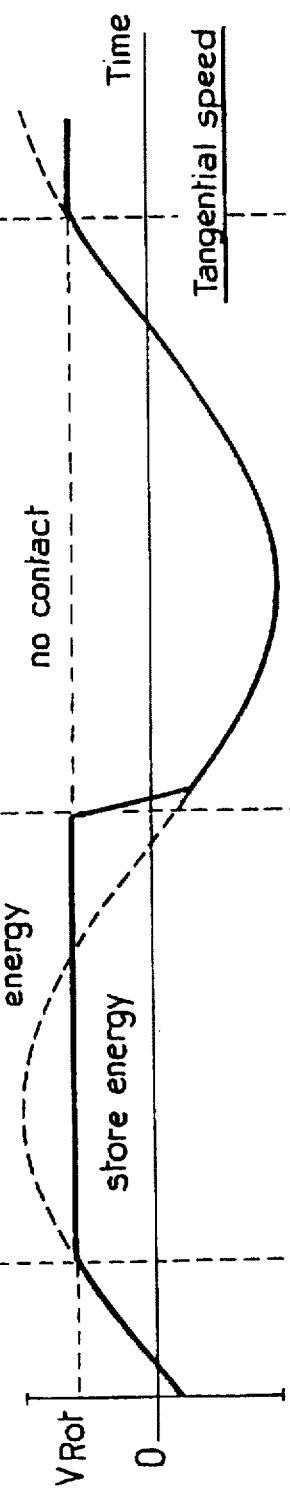

The shape memory alloy interfaces proposed by the invention make it possible to operate with stress and speed cycles as shown in FIGS. 5a and 5b.

The sinewave shown in FIG. 5a shows the deformation imparted to the stator 1 by the piezoelectric elements 5.

For a given interface, during the portion of the cycle where the stator 1 and the rotor 4 are in contact (portion I), the normal thrust force between them is peak-limited by the threshold stress value of the shape memory alloy (FIG. 5a).

The tangential friction force, which is proportional to the normal thrust force between the stator 1 and the rotor 4, is then likewise constant and remains below the slip threshold, such that the contact zone of the stator 1 then has a tangential speed which is equal to that of the rotor 4 (FIG. 5b).

In addition, the piezoelectric elements 5 are controlled in such a manner that the deformation imparted to the stator 1 is such that over the second portion of the cycle (portion II), the stator 1 and the rotor 4 are not in contact, with the thrust force between the stator 1 and the rotor 4 then being zero (FIG. 5a).

With such operation, energy losses due to friction between the stator and the rotor 4 are negligible.

They are zero during that portion of the cycle in which the stator 1 and the rotor 4 are in contact without sliding, the shape memory alloy interface 6 stores deformation energy at constant stress so long as the speed of vibration is greater than that of the rotor, and then restoring the energy (FIG. 5b) while the speed of vibration is decreasing so as to be less than the speed of the rotor.

Energy losses due to friction are also zero during the other portion of the cycle since the stator 1 and the rotor 4 are no longer in contact.

Given that these energy losses are reduced, stresses can be applied to the ceramics of the motor that are greater than is possible in piezoactive motors that have no shape memory elements, thus making it possible to envisage greater torque levels.

Figure 5C:
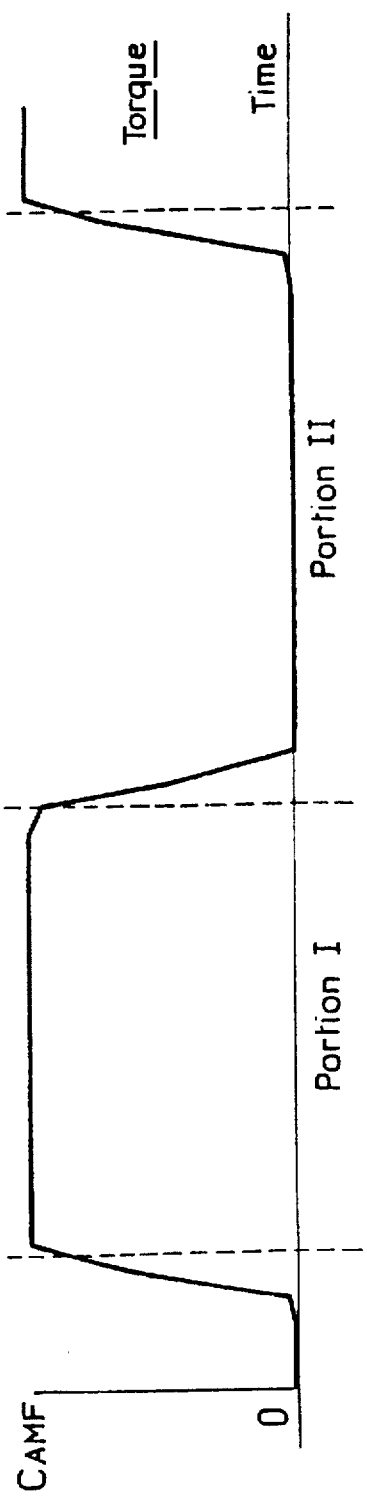
FIG. 5c is a graph showing driving torque for the cycle of FIGS. 5a and 5b.

As illustrated in FIG. 5c, it will also be observed that with a motor of the type described above, the stator 1 drives the rotor 4 at substantially constant torque throughout the phase in each cycle during which the stator 1 and the rotor 4 are in contact.

I claim:

1. A vibration motor comprising:

a stator;

a rotor;

excitation means for deforming said stator in a vibratory mode and for enabling it to rotate the rotor;

a contact layer located between said stator and said rotor, said contact layer being formed, at least in part, of shape memory alloy.

2. A vibration motor comprising:

a stator and a rotor together with excitation means for deforming said stator in a vibratory mode enabling it to rotate the rotor, wherein the stator and/or the rotor include(s) a shape memory alloy in the vicinity of or at a zone of mutual contact between the rotor and the stator, and wherein the rotor and/or the stator include(s) a layer of shape memory alloy in the vicinity of or at said zone of mutual contact.

3. A vibration motor comprising:

a stator and a rotor together with excitation means for deforming said stator in a vibratory mode enabling it to rotate the rotor, wherein the stator and/or the rotor include(s) a shape memory alloy in the vicinity of or at a zone of mutual contact between the rotor and the stator, and wherein the rotor and/or the stator comprise(s) an array of elements of shape memory alloy superposed on a contact layer.

4. A vibration motor according to claim 3, wherein the contact layer is also formed of shape memory alloy.

5. A vibration motor according to claim 4, wherein the shape memory allow elements and the contact layer are of one piece, the elements being defined by recesses disposed inside a layer.

6. A vibration motor comprising:

a stator and a rotor together with excitation means for deforming said stator in a vibratory mode enabling it to rotate the rotor, wherein the stator and/or the rotor include(s) a shape memory alloy in the vicinity of or at a zone of mutual contact between the rotor and the stator, and wherein the excitation means are controlled in such a manner that during each cycle, the rotor and the stator press against each other without slip in said contact zone during a first portion of the cycle, and do not press against each other during the other portion of the cycle.

7. A vibration motor according to claim 1, wherein said contact layer bears an array of shape alloy elements and uses the shape memory material of the shape alloy elements to amplify the stresses which are respectively tangential and normal to said contact layer.

8. A vibration motor according to claim 7, wherein said shape alloy elements comprise pegs of shape memory alloy, said pegs being defined between recesses formed in said contact layer.

9. A vibration motor according to claim 7, wherein said contact layer is, in addition to the array of shape alloy elements, also formed of a shape memory alloy.

10. A vibration motor according to claim 1, wherein said contact layer comprises a plurality of pegs which are fixedly secured between two layers of shape memory alloy.

11. A vibration motor according to claim 1, wherein said exciting means comprises a plurality of piezoelectric ceramic elements which are disposed between a body member and said stator in a manner to engage both the body and said stator, said piezoelectric ceramic elements engaging a side of said stator which opposite that side which engages said contact layer.

12. A vibration motor according to claim 1, wherein said contact layer is thin and in the order of a few micrometers thick.

* * * * *